3,227,746
PRODUCTION OF ACRYLIC ACID ESTERS
Fritz Knörr and Helmuth Spes, Burghausen, Upper Bavaria, Germany, assignors to Wacker-Chemie G.m.b.H., Munich, Germany
No Drawing. Filed Dec. 26, 1962, Ser. No. 247,273
Claims priority, application Germany, Dec. 29, 1961, W 31,379
3 Claims. (Cl. 260—486)

The present invention relates to an improved process of producing acrylic acid esters, preferably the lower alkyl esters of acrylic acid and methacrylic acid, by cleavage of the corresponding β-alkoxy carboxylic acid esters in the presence of dehydration catalysts.

It is known that acrylic acid methyl ester can be produced from β-methoxy propionic acid and methanol in the presence of an acid dehydration catalyst and the acrylic acid methyl ester produced is distilled off as an azeotropic mixture with methanol and water and the excess water is distilled off as an azeotropic mixture with β-methoxy propionic acid methyl ester.

According to another proposal it is possible to cleave β-ethoxy-propionic acid ethyl ester in the presence of large quantities of ethanol and water.

All of these processes have the disadvantage that additional quantities of alcohol must be present during the cleavage and such excess alcohol cannot be separated off by simple distillation as alcohols form azeotropic mixtures with the acrylic acid esters. These azeotropic mixtures must first be separated with considerable expense of energy by one of the known methods of separation, such as, extraction, extractive distillation or by removal of one of the components with the aid of an entraining agent. Each additional quantity of alcohol therefore renders the following processing of the cleavage products more difficult and more costly.

An attempt has also been made to convert β-ethoxy propionic acid ethyl ester with water without addition of alcohol. However, in such case a portion of the β-ethoxy propionic acid ethyl ester hydrolyses to unusable acids and another portion goes over into the distillate, the separation of which is rendered considerably more difficult thereby.

According to the invention it was found that cleavage of β-alkoxy carboxylic acid esters, preferably those in which the β-alkoxy group is a lower alkoxy group, could be accomplished in the presence of dehydration catalysts at 100° to 200° C. without addition of alcohol without occurrence of any hydrolysis and without having the unconverted β-alkoxy carboxylic acid pass over into the distillate if water is added in quantities not over 11% and preferably in a quantity of about 3 to 10% with reference to the β-alkoxy carboxylic acid ester.

Every usual organic or inorganic acid or their esters can be used as the dehydration catalysts, such as, for example, sulfuric acid, sulfoacetic acid, p-toluene sulfonic acid, phosphoric acid, polyphosphoric acid, fluorinated and chlorinated sulfuric or phosphoric acids, methyl sulfuric acid, dimethyl sulfate and the like. The quantity of catalyst employed can vary within wide limits and depends upon the type of catalyst and the desired conversion.

The process can be carried out discontinuously or continuously. In continuous operation, for example, a mixture of β-alkoxy carboxylic acid ester, water and catalyst and if desired a polymerization inhibitor is provided as sump in a flask provided with an effective fractionating column and heated. After cleavage has initiated as much β-alkoxy carboxylic acid ester with about 3–11% of water added thereto is added per hour as cleavage product distills off at the head of the column. The sump temperature can be regulated by the quantity of water contained in the β-alkoxy carboxylic acid ester run in and amounts to about 130–160° C. No ether formation worth mentioning takes place under the reaction conditions of the process.

The cleavage product, which in the case of β-methoxy propionic acid methyl ester cleavage according to the invention, contains about 70% of acrylic acid methyl ester, 4–7% of water and 20–25% of methanol can be processed in the usual manner whereupon already through simple fractional distillation the major portion of the acrylic acid methyl ester contained in the cleavage product is obtained methanol free in the form of its heteroazeotrope with water and in pure form after separating off the water phase. It also is possible to process the cleavage product as such by the usual separating methods but in such instance considerably less energy and distillation assistants are required than for the separation of the cleavage product of the previously known practical methods which all required additions of alcohol. The same is also true for the acrylic acid esters higher than the methyl ester.

The following examples will serve to illustrate the invention with reference to a number of embodiments thereof.

*Example 1*

3000 g. of β-methoxy propionic acid methyl ester, 320 g. of concentrated sulfuric acid and 150 g. of water were placed in a flask provided with a thermometer, an inlet tube and an automatic fractionating column and heated until cleavage initiated at about 105° C. Thereafter, β-methoxy propionic methyl ester to which 5.71% of water had been added was supplied to the flask through the inlet tube in a quantity equivalnt to the cleavage product which distilled off. The sump temperature during the run rose to 140–150° C. By exact regulation of the head temperature to about 66° C. the cleavage product distilling over was obtained free of β-methoxy propionic acid methyl ester. The average amount of β-methoxy propionic acid methyl ester water mixture supplied per hour was 600 g. The average hourly yield of cleavage product was 588–594 g. which as an average contained 68.8% of acrylic acid methyl ester, 6.0% of water and 25.1% of methanol. The cleavage product could be processed by one of the usual known methods. The average yield of acrylic acid methyl ester was 98.4% and of methanol was 96.5% with reference to the quantity of β-methoxy propionic methyl ester supplied. After 400 hours of operation no essential reduction in conversion or increase in viscosity of the sump by resin formation could be ascertained.

Analogously β-methoxy isobutyric acid methyl ester was split in the presence of 10.5% of water to methyl methacrylate and methanol. The same yields were obtained. The head temperature was 70° C.

*Example 2*

The procedure of Example 1 was repeated with β-methoxy propionic acid methyl ester but without addition of water. The cleavage which became slower and slower came to a standstill after only 8 hours' operation in view of the massive resin formation in the flask.

*Example 3*

The procedure of Example 1 was repeated with β-methoxy propionic acid methyl ester but in this instance with an addition of 12.0% of water. Under these conditions the distillate as an average contained 8% of unconverted β-methoxy propionic acid methyl ester. The velocity of the cleavage reaction was only about 60% of that of Example 1.

Example 4

1700 g. of β-methoxy propionic acid methyl ester, 1700 g. of 85% of phosphoric acid as catalyst and 185 g. of water were placed in an apparatus as described in Example 1 and heated until cleavage initiated at about 130° C. Thereafter, β-methoxy propionic acid methyl ester to which 6.39% of water had been added was supplied to the flask in a quantity equivalent to the cleavage product which distilled off. By exact regulation of the head temperature to 66° C., the cleavage product distilled over was obtained free of β-methoxy propionic acid methyl ester. The average amount of β-methoxy propionic acid methyl ester-water mixture supplied per hour was 650 g. and the average yield of cleavage product per hour was 635–640 g. The cleavage product as an average contained 68.7% of acrylic acid methyl ester, 6.1% of water and 25.2% of methanol and was washed up by one of the usual methods. The average yield of acrylic acid methyl ester was 98.6% and of methanol was 97.0% based upon the β-methoxy propionic methyl ester supplied. After 500 hours' operation no essential reduction in conversion or increase in viscosity of the sump by resin formation could be ascertained.

Example 5

400 g. of β-methoxy proprionic acid ethyl ester, 400 g. of 85% phophoric acid and 40 g. of water were placed in an apparatus as described in Example 1 and heated until cleavage initiated at about 130° C. Thereafter, β-methoxy propionic acid ethyl ester to which 7.5% of water had been added was supplied to the flask in a quantity equivalent to the cleavage product which distilled off. By regulation of the head temperature to about 71–74° C. the cleavage product distilling over was obtained free of β-methoxy propionic acid ethyl ester. The average amount of β-methoxy proprionic acid ethyl ester-water mixture supplied per hour was 200 g. and the average yield of cleavage product per hour was 195 g. The cleavage product was worked up by one of the known methods to acrylic acid ethyl ester and methanol. The acrylic acid ethyl ester was obtained in a 95% yield and the methanol in a 96% yield. Resinification could not be ascertained.

Example 6

400 g. of β-butoxy propionic acid butyl ester, 400 g. of 85% phosphoric acid and 40 g. of water were placed in an apparatus as described in Example 1 which in addition was provided with a separator in the distillate conduit for separating the layers forming therein and a conduit for returning the lower layer to the flask and were heated until cleavage initiated at about 140° C. Thereafter, β-butoxy propionic acid butyl ester to which 5% of water had been added was supplied to the flask in a quantity equivalent to the cleavage product which distilled off. During the cleavage the temperature assumed in the flask was 155–160° C. By exact regulation of the head temperature to about 91° C. the cleavage product distilling over was obtained free of β-butoxy propionic acid butyl ester. The average amount of β-butoxy propionic acid butyl ester-water mixture supplied per hour was 110 g. and the average yield of cleavage product per hour was 102 g. It contained 5% of water and was worked up to acrylic acid butyl ester and methanol in yields of 93 and 94% respectively.

We claim:

1. In a continuous process for the production of an acrylic acid ester and an alkanol by cleavage of a β-lower alkoxy alkanoic acid lower alkyl ester having at least one hydrogen atom on the α carbon atom in the presence of dehydration catalyst at a temperature between 100 and 200° C., the steps of heating a mixture of the β-alkoxy alkanoic acid ester and the dehydration catalyst having about 3% to 11% by weight of water with reference to the β-alkoxy alkanoic acid added thereto to a temperature between 100 and 200° C. to effect said cleavage in the absence of any alcohol other than the alkanol formed by cleavage of the β-alkoxy alkanoic acid ester, continuously distilling off the cleavage product and continuously adding a quantity of the β-alkoxy alkanoic acid ester equivalent to the cleavage product distilling off to which 3–11% by weight of water has been added.

2. The process of claim 1 in which the β-alkoxy alkanoic acid ester is a β-lower alkoxy propionic acid lower alkyl ester.

3. The process of claim 1 in which the β-alkoxy alkanoic acid ester is a β-lower alkoxy isobutyric acid lower alkyl ester.

References Cited by the Examiner

UNITED STATES PATENTS

| | | | |
|---|---|---|---|
| 2,376,704 | 5/1945 | Kung | 260—486 |
| 2,485,510 | 10/1949 | Redmon | 260—486 |
| 2,525,249 | 10/1950 | Weizmann | 260—486 X |

LORRAINE A. WEINBERGER, *Primary Examiner.*

LEON ZITVER, *Examiner.*